Feb. 6, 1951 N. B. GREENE ET AL 2,540,200
BUCKET UNLOADING AND LOADING DEVICE
Filed April 24, 1946 5 Sheets-Sheet 5
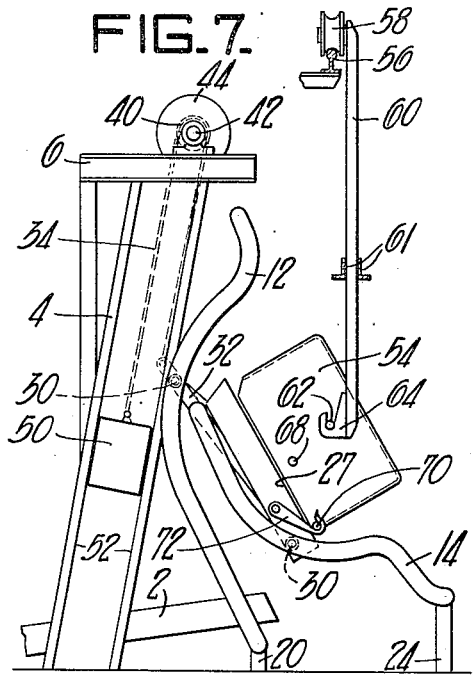
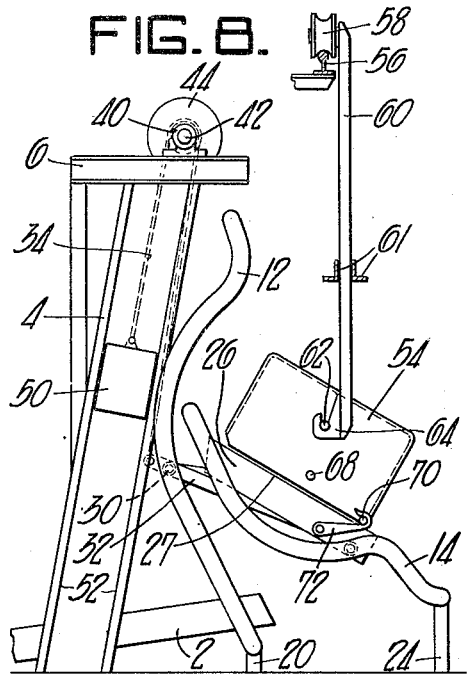
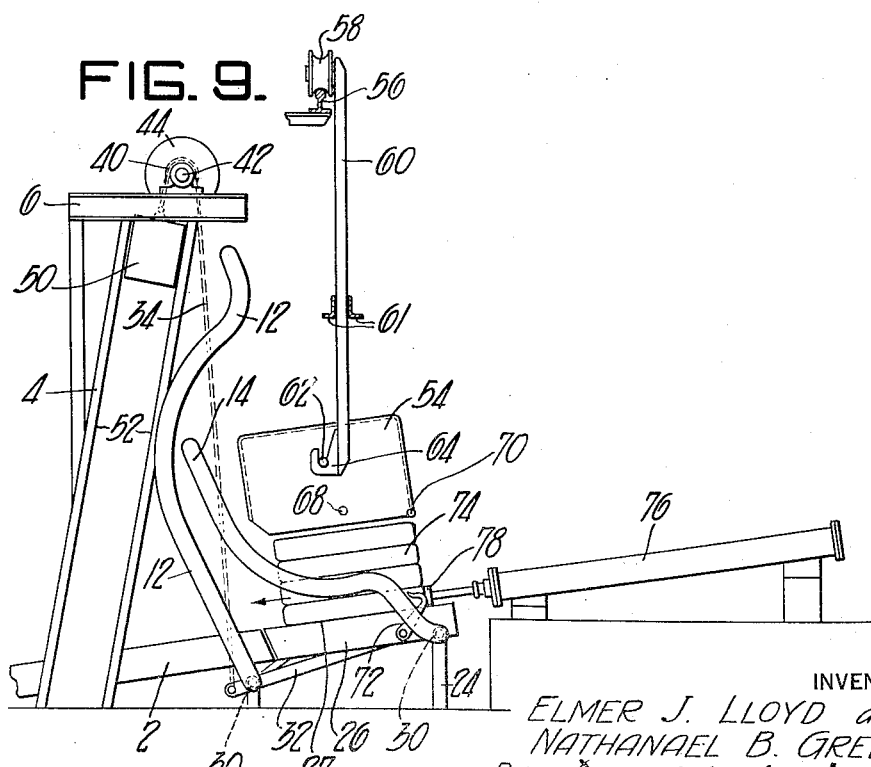
INVENTORS:
ELMER J. LLOYD and
NATHANAEL B. GREENE,
BY: Donald G. Dalton
THEIR ATTORNEY.

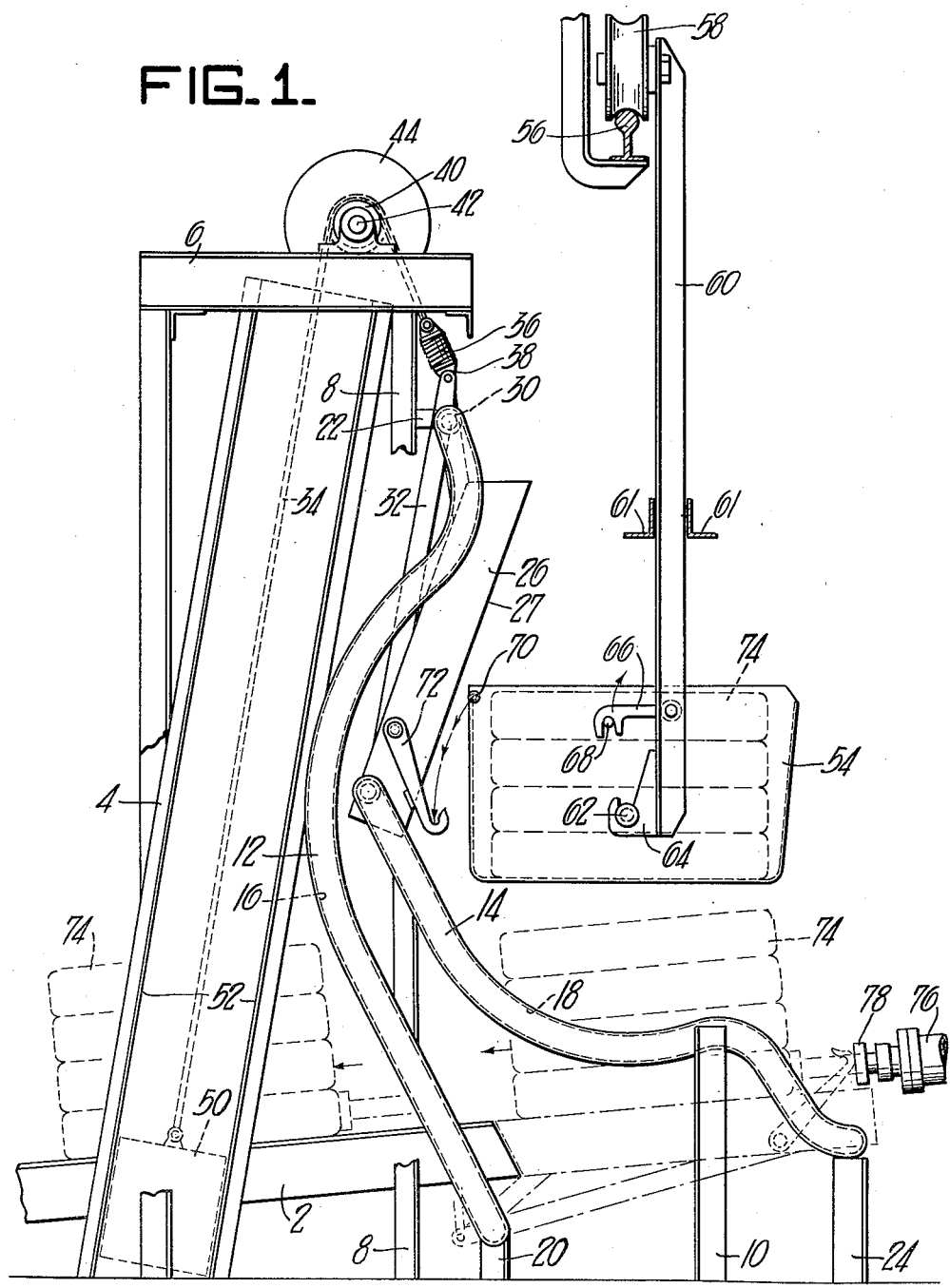

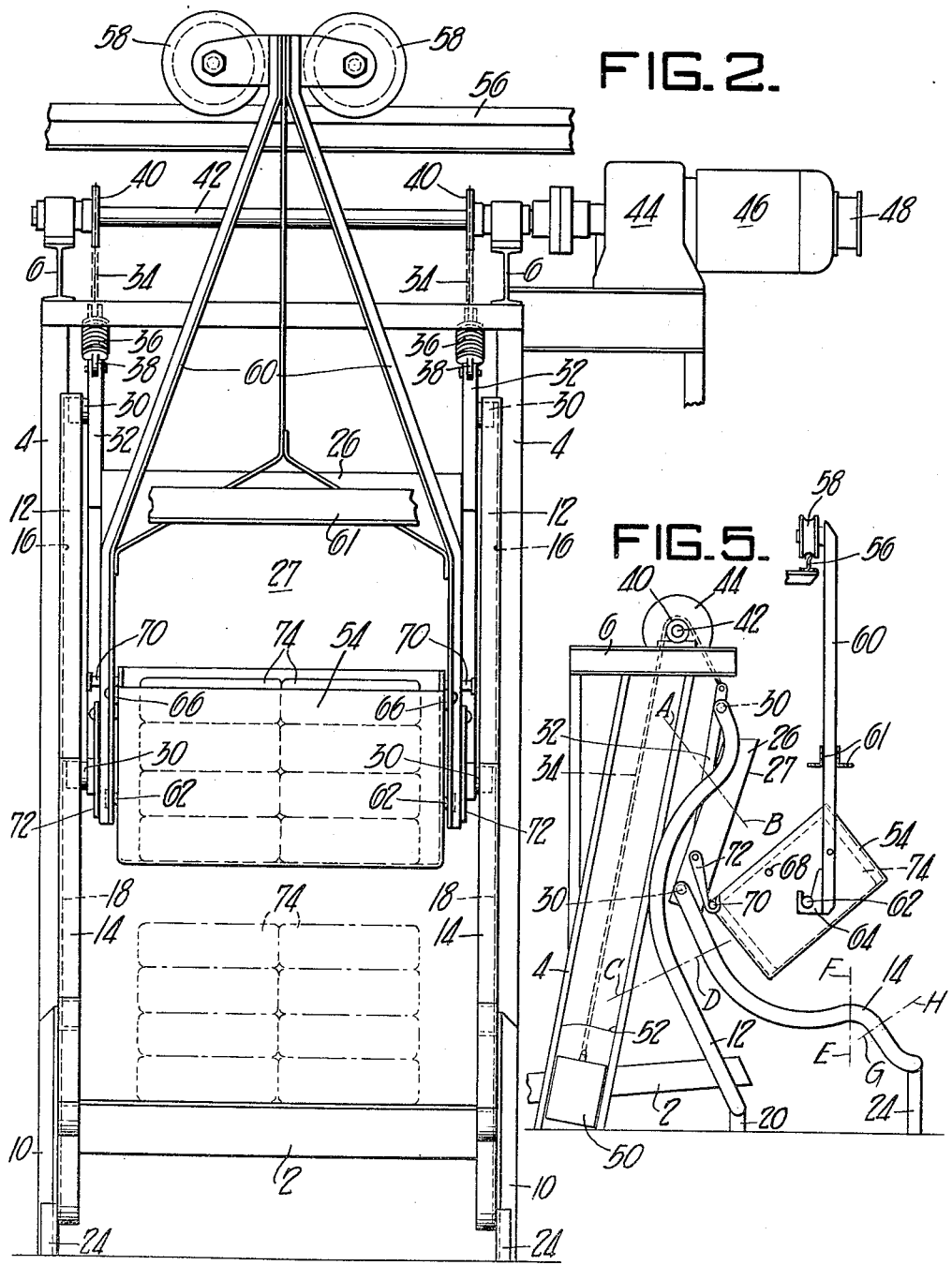

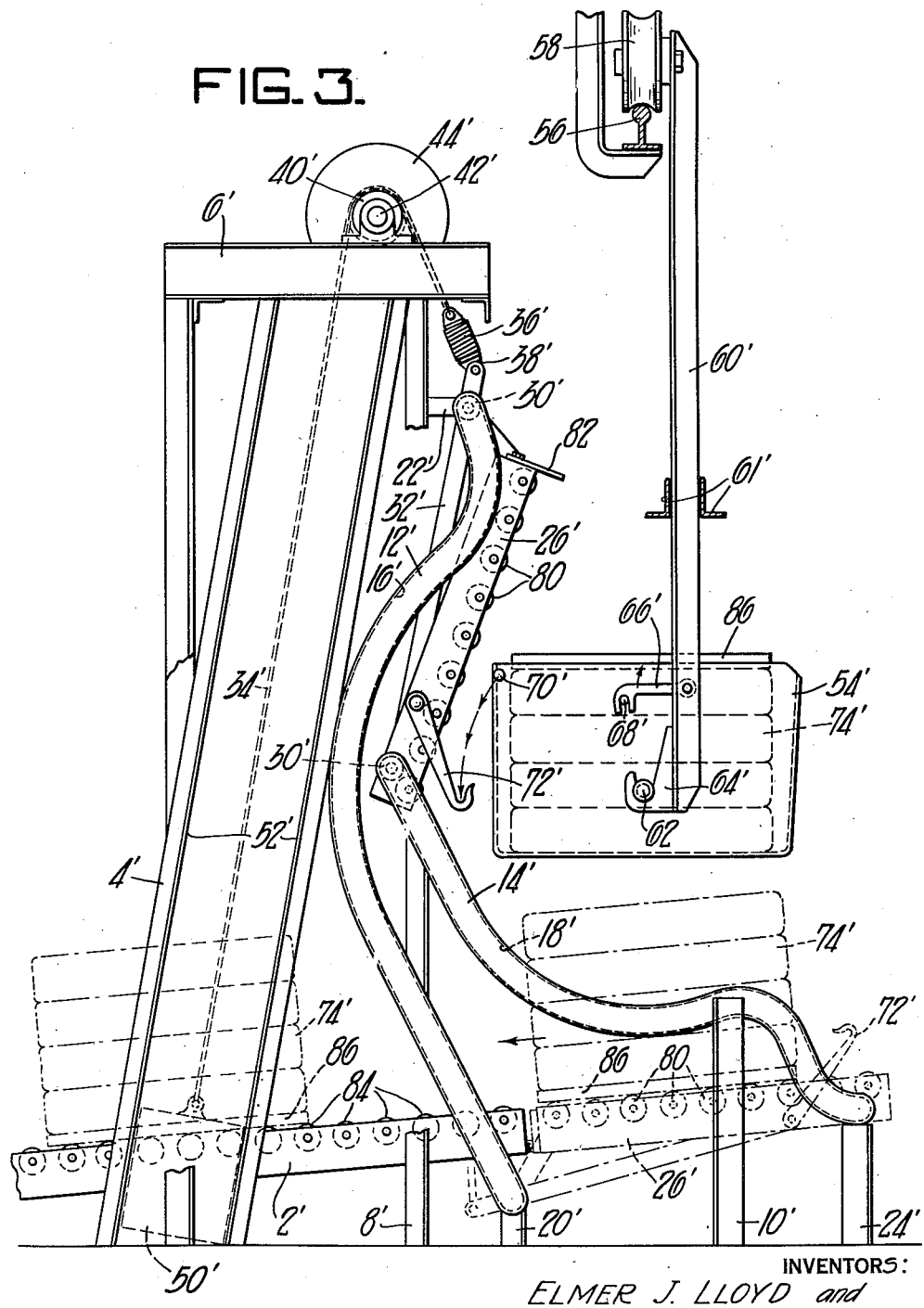

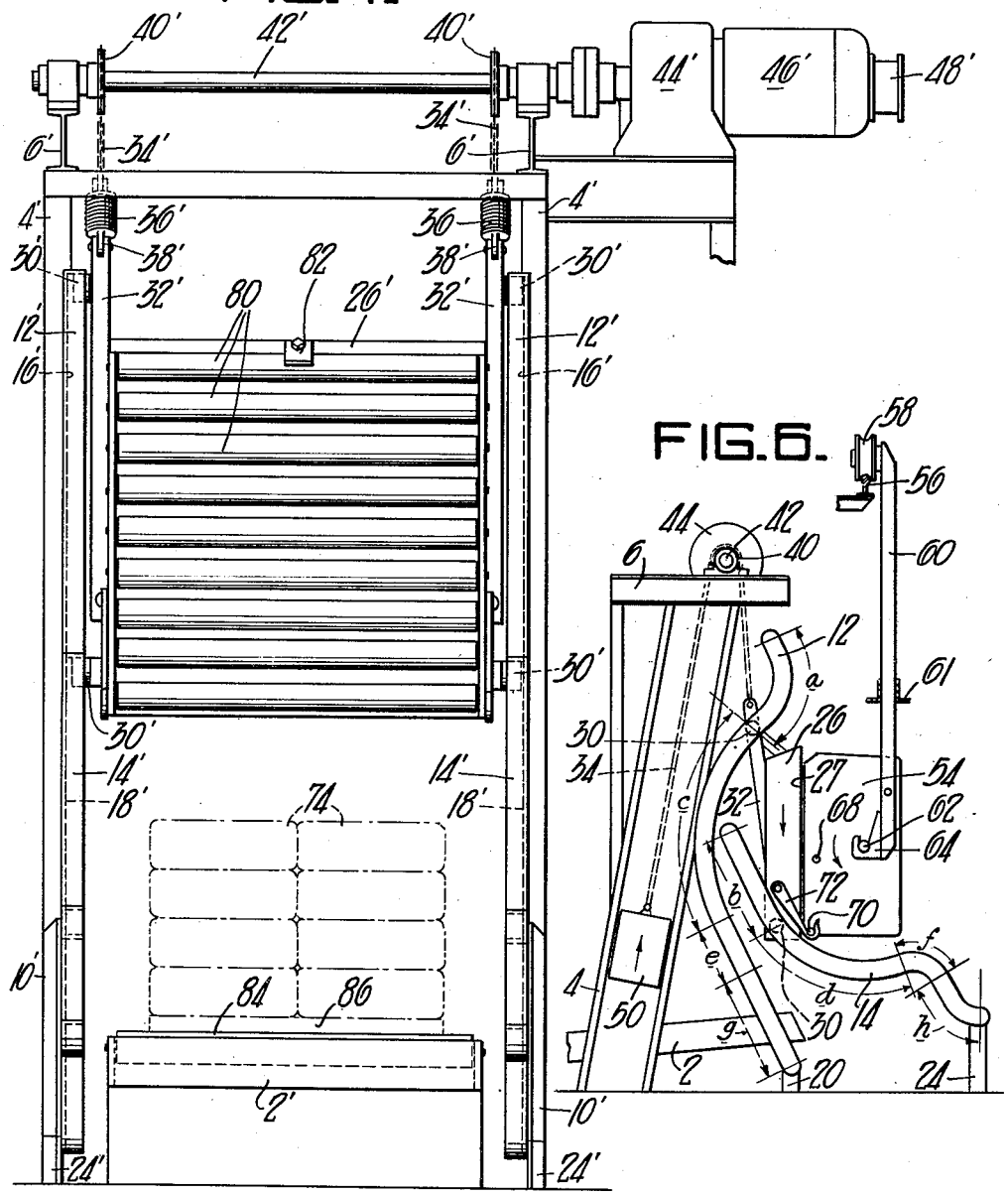

Patented Feb. 6, 1951

2,540,200

UNITED STATES PATENT OFFICE 2,540,200

BUCKET UNLOADING AND LOADING DEVICE

Nathanael B. Greene and Elmer J. Lloyd, New Haven, Conn., assignors to The American Steel and Wire Company of New Jersey, a corporation of New Jersey Application April 24, 1946, Serial No. 664,594

10 Claims. (Cl. 214—1.1)

This invention relates to a device for removing the load from a carrier body of the tilting type, and if desired, for loading such carrier body.

The invention has among its objects the provision of a simple, easily operated, device for unloading or loading a carrier body of the tilting type.

A further object resides in the provision of a loading or unloading device of the above type which is characterized by its ability to perform such unloading or loading operations without mechanical shock to the load or the carrier body. In addition, the device turns the load over during the unloading or loading operation, and therefore, has proved particularly useful in operations where such inverting of the load is required.

These and further objects of the invention will be more fully apparent in the following description.

The invention will be more readily understood by reference to the accompanying drawings, in which:

Figure 1 is a view in side elevation of one modification of the device, such device being shown in connection with a tilting bucket which is to be unloaded, such bucket being supported by a monorail;

Figure 2 is a view in end elevation of the unloading and loading device shown in Figure 1, the view being taken from the right hand end of Figure 1;

Figure 3 is a view in side elevation of a modification of the unloading and loading device shown in Figures 1 and 2, such device likewise being shown in connection with a monorail supported tilting bucket;

Figure 4 is a view in end elevation of the apparatus shown in Figure 3, the tilting bucket, its supports, and the tilting platform of the unloading and loading device being omitted; and Figures 5 to 9, inclusive, are schematic views in side elevation of the apparatus shown in Figures 1 and 2, such figures depicting serially various positions assumed by the platform and bucket as the bucket is unloaded.

In the embodiments of the unloading and loading device of the present invention shown and described, the device is employed for unloading and loading a tiltably supported bucket mounted on a monorail conveyor. It will be obvious, however, that the tiltably supported carrier body may be of other types so long as it is capable of supporting its load without spilling when tilted at an appreciable angle. It will also be apparent that such tiltable load carrier may be supported in various other manners, the primary requirement of such carrier being that it be tiltable about an axis at the unloading or loading station so that it may be at least substantially inverted.

The unloading and loading device shown in Figures 1 and 2 is illustrated in conjunction with a conveyor generally indicated at 2, which is shown as being slanted somewhat with respect to the horizontal and as having a plane upper surface. It is obvious that various other known types of conveyors may be employed. In some instances, furthermore, conveyor 2 may be dispensed with, the load being transferred directly from the platform to a means such as a truck. Straddling the upper end of conveyor 2 are two parallel standards 4 inclined somewhat to the vertical, the upper ends of standards 4 being connected by a transverse beam structure or platform 6. Standards 4 are braced by the parallel uprights 8 also straddling conveyor 2, members 8 being connected from the platform 6 to the foundation. Further upright members 10 and 24 lying in planes containing uprights 8 along the sides of conveyor 2 are provided in parallel sets parallel to members 4 and 8.

Connected to the vertical framework composed of members 4 and 8 are two curved parallel platform guiding members 12, likewise straddling conveyor 2, and two shorter parallel curved platform guiding members 14, the members 12 and 14 on each side of the structure lying in the same vertical plane. Each of the guiding members 12 is rigidly fixed to the foundation and to the structure so far described by means of the short vertical support 20, at the bottom thereof, and the short horizontal support 22 from the corresponding member 8 to the upper end thereof, and by reason of its attachment to member 8 at intermediate points where the guiding member 12 crosses such member. Each of the shorter curved trackways 14 is likewise rigidly attached to the structure by means of the vertical support 10 from the foundation to the upwardly curved portion of the guiding member near its lower end, by the upright 22 to the foundation from the extreme lower end of the trackway, and by reason of its attachment to the corresponding member 8 at its upper end. The two curved sets of guiding members are made in the form of channels, the channels in each set facing each other, so that there is provided a trackway 16 in each of the long guiding members 12, and a trackway 18 in each of the short guiding members 14.

The curved tracks above described provide support and guidance for a platform 26, which, in the modification shown in Figures 1 and 2, has a plane bucket or carrier confronting face 27. The platform is provided at the lower end, as shown in Figure 1, with a pair of rollers 30 mounted on stub shafts extending horizontally from the sides of the platform, rollers 30 running in tracks 18. The upper rear surface of the platform, as shown in Figure 1, is provided with a rigid rearwardly and upwardly extending arm structure designated generally by the reference character 32, the upper end of the arm structure being provided with rollers 30 which run in the long curved trackways 16. As a result, the platform, which may be raised and lowered by mechanism to be described, is caused to assume a predetermined angular and lateral position at every point in its vertical travel, such angular and lateral positions being determined by the configuration of tracks 16 and 18.

Hoisting and lowering of the platform is accomplished by means of the two parallel hoisting chains 34 attached to the upper end of the arm structure 32 on the platform through the medium of clips 38 on the upper end of the arm structure and the springs 36, one of which is interposed between each chain 34 and each clip 38. Such springs cushion the platform from shock as it is raised and lowered by the chains. Chains 34 run over sprockets 40 on hoist shaft 42 which runs parallel to the platform 6, such shaft being driven by means of motor 46 through the interposed gear reducer 44. The motor is provided with a solenoid brake, indicated generally at 48, so that by provision of suitable conventional motor and brake controls, not shown, the platform may be stopped at any desired vertical position. The lower ends of the chains extend an appreciable distance down columns 4 where they are attached to counterweights 50, which slide within guideways 52 provided in such columns.

The load carrying device shown consists of a pivotally mounted bucket 54 supported for travel on a monorail 56 by means of one or more rail engaging wheels 58 to which is connected the bucket support or hanger 60. At the unloading or loading station, hanger 60 preferably runs between opposed hanger guides 61 to hold the hanger stably and in the desired spaced relationship from platform 26. The bucket is provided with a pair of trunnions 62 received in the trunnion supports 64 attached to the lower end of the hanger, so that the bucket may pivot about the trunnions from an upright to an inverted position. The bucket may be held in its upright position by means of latches 66 pivoted to the hanger as shown, such latches having recesses in the outer bottom faces thereof to receive the lugs 68 projecting from the sides of the bucket. By raising the latches to disengage the lugs 68 from the recesses therein, the bucket may be released so as to be tilted at the loading and unloading station. The bucket is further provided on the upper edge of the side thereof, confronting platform 26 with laterally projecting studs 70, such studs extending beyond the sides of the bucket.

Face 27 of the platform is made of a size and shape such that it substantially covers the load in the load carrying device, and preferably, so that it forms a complete cover for the load carrying device, such as bucket 54, so as to prevent escape of the load from between the bucket and the platform when the load is transferred to the latter, or vice versa. Thus, in the apparatus shown, face 27 of the platform extends somewhat beyond the side edges of the bucket, and studs 70 extend a distance somewhat beyond the edges of the platform. Each side face of the platform at a point somewhat below the center thereof is provided with a pivoted hook-like member 72, the hooked lower end of each of which extends toward the bucket so as to be engaged by the studs 70, when the bucket is tipped in a counterclockwise direction in the showing of the device in Figure 1. A load 74 is shown within the bucket, such load in the illustration being ready for transfer from the bucket to the conveyor 2. The device shown in the first modification is such, as will be more fully apparent by consideration of Figures 5 to 9, inclusive, that after the platform has been lowered somewhat to cause it to approach the bucket, the bucket may be tilted so as to engage stud 70 with hook 72. Platform 26 may then be further lowered to tilt the bucket to a position approaching fully inverted position whereupon the platform then drops away from the bucket to free the load therefrom, the preferred design shown being such that in its lowest position the platform forms a prolongation of conveyor 2. To facilitate transfer of the load from the platform in such lowest position, there is provided a power cylinder 76 at the rear end thereof, such cylinder being provided with a pusher member 78 on the end of its piston rod so that the load may be pushed along the platform onto the conveyor 2.

In the modified device shown in Figures 3 and 4 the general arrangement of parts is the same as that shown in Figures 1 and 2 and like parts are correspondingly numbered, except that in Figures 3 and 4, such numbers are primed. The device shown in Figures 3 and 4 differs from that of the first modification by having the conveyor 2' of the roller conveyor type equipped with rollers 84, by having platform 26' likewise in the form of a portion of roller conveyor, such platform being provided with rollers 80. In this instance, since the conveyor at the bottom of the device made up of portions 2' and the platform 26' in its lowest position is tilted with respect to the horizontal, no pusher member is required to cause the load to travel to the left in Figure 3. On the contrary, it becomes desirable to equip platform 26' with a stop device 82 to restrain motion of the load down the conveyor until it is fully clear of the bucket. Such stop device 82 may be provided at the end of the platform 26' which is uppermost when the platform is in its vertical position, such end becoming the forward end of such platform when the latter is positioned to constitute a prolongation of conveyor 2'. As shown, the stop consists of an arm pivotally mounted on the upper end of the platform so that it may be selectively swung above and below the surface of the platform as by means of an operating arm (not shown) affixed to the stop arm. It is preferred in the use of this modification of the apparatus to employ a pallet 86 on top of the load to facilitate travel of the load down the roller conveyor. Such pallet may be formed of a wooden platform, if desired.

The manner in which the device operates to unload a load carrying device, or conversely to transfer a load to such device, will be more readily apparent by consideration of Figures 5 to 9, inclusive, wherein the device is shown schematically in successive stages of a bucket unloading operation. As shown in Figure 5, the long curved guides 12 which guide the upper end of the platform in their physical make-up may be considered to be composed of three parts, the upper part from the upper end thereof down to the line A—B being in the form of a curve of relatively short radius, such curve being convex with respect to the trunnions 62, that is, the axis of tilting of the bucket, and somewhat above it and to the left, as shown. The intermediate portion of guide 12 extending downwardly from the line A—B to the line C—D is in the form of a circular arc concentric with the axis of tilting of the bucket and the lowest portion of such guide consists of a straight line portion from the line C—D to the bottom thereof, such last named portion slanting downwardly from line C—D to a point substantially beneath the bucket. The shorter guide 14 may be considered, as to contour, to consist of four portions, the topmost of which is essentially a straight line portion extending from the top thereof to the line C—D. Below such portion the part of the guide 14 from line C—D to line E—F is in the form of a circular arc concentric about the axis of tilting of the bucket. The next portion, between lines E—F and G—H, is in the form of an arc of relatively short radius, such arc being convex to the axis of tilting of the bucket, the center of the arc lying below the guide 14 and somewhat to the right of the vertical line through trunnion 62. The last and lowermost portion of guide 14 consists of a circular arc of relatively short radius from the line G—H to the bottom end of the guide, the center of such arc being above the guide and somewhat to the right of the center of the arc of the preceding arcuate portion of the guide.

The shape of guides 12 and 14 and consequently of tracks 16 and 18 is such that in the first portion of the downward travel of platform 26 the platform approaches the bucket so as to substantially close the upper end thereof when the bucket is so tilted that such upper end is parallel with the face 27 of the platform. Thereupon continued travel of the platform in a downwardly direction is such that the bucket turns to a position approaching the inverted horizontal position, the relationship between platform and bucket during such turning being maintained such that the platform continues substantially to close the bucket. This requires that the platform travel in an arc concentric with the tilting axis of the bucket. This relationship is preserved until the platform has reached a position approaching the horizontal, which is at least substantially on the order of the angle of the angle of repose of the load on the platform. Continued travel of the platform past such point functions to free the load vertically from the bucket and finally to position the platform as a prolongation of the fixed conveyor. Guides 12 and 14 and thus tracks 16 and 18 therefore may be considered, irrespective of their actual configuration, each to be made up of four portions, each of such four portions coming into play in one of each of the four stages of travel on the platform. Thus, as shown in Figure 6, in the stage wherein the platform is caused to approach the bucket while still remaining substantially vertical, the upper guide rollers thereon travel within portion *a* of track 16 on guide 12, and the lower guide rollers travel in portion *b* in track 18 on guide 14. When the platform is then turned about the axis of tilting of the bucket to transfer the load from the bucket to the platform, the upper rollers travel in portion *c* of track 16 and the lower rollers travel in portion *d* of track 18. When the platform begins to pull away vertically from the bucket to free the load therefrom, the rollers thereon travel within track sections *e* and *f*, and when the platform is finally lowered to its final position as a prolongation of the fixed conveyor and the load is finally freed from the bucket, the rollers travel within the track portions *g* and *h*.

With the above in mind the bucket unloading operation from the position in which the bucket is horizontal and the platform substantially vertical, as shown in Figure 1, through the various stages thereof can be readily traced. In Figure 5, the bucket has just begun to tilt so that the studs 70 may be engaged in the hooks 72. Thereupon the platform hoisting and lowering motor 46 is actuated to lower platform 26 successively through the stage shown in Figure 6, when the platform approaches the bucket substantially to close it, and through the stages shown in Figures 7 and 8 where the platform is progressively tilted around the tilting axis of the bucket. In Figure 8, the platform has assumed a position on the order of the angle of repose of the load on the platform, and from this stage on the platform withdraws from the bucket in a direction having a substantial vertical component until it reaches the final lowered end position shown in Figure 9.

In some instances it is desired that the apparatus above described as being used in a bucket unloading operation shall be used to load the bucket. In such operation the load is placed upon platform 26 in the position it has in Figure 9, with the inverted bucket above it. The hoisting motor 46 is then actuated to raise the platform into a position such as shown in Figure 8, whereupon the load enters the bucket and the platform approaches the bucket sufficiently to allow engagement of studs 70 with hooks 72. The bucket is then progressively raised through the positions shown serially in Figures 7, 6, and 5, until it reaches the position shown in Figure 1, whereupon latches 66 may be applied to the studs 68 to hold the bucket in upright position.

Whereas preferred modifications of the bucket unloading and loading device of the present invention have been described, it will be understood that the device is capable of considerable variation within the teaching of the invention. We therefore desire to claim as new the following.

We claim:

1. Apparatus for loading and unloading a bucket-like load carrying device mounted for tilting movement about a pivotal axis so that it may be inverted comprising a platform having a surface confronting the load carrying device of such size and shape that it will substantially cover the top of the load carrying device, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to cause the platform to turn in its downward travel so that it occupies a generally horizontal position when beneath the carrying device.

2. Apparatus for loading and unloading a bucket-like load carrying device mounted for tilting movement about a pivotal axis so that it may be inverted comprising a platform having a surface confronting the load carrying device of such size and shape that it will substantially cover the top of the load carrying device, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after initial approach of the platform toward such device and until it has assumed a position beneath it at an angle to the horizontal on the order of the angle of repose of the load on the platform that the platform substantially prevents escape of the load from the carrying device.

3. Apparatus for loading and unloading a pivotally supported load carrying device comprising a platform having a surface confronting the load carrying device of such size and shape that it will substantially cover the top of the load carrying device, means to guide the platform for movement from a position substantially horizontally opposite the load carrying device downwardly to a position beneath such carrying device, such guiding means comprising two spaced sets of trackways extending generally downwardly beneath the carrying device from one side thereof, trackway engaging members adjacent the ends of the platform, the members on one end of the platform engaging one set of trackways and those on the other end of the platform engaging the other set of trackways to cause each end of the platform to follow its respective set of trackways, and means to raise and lower the platform along the trackways, each set of trackways having successive portions from their tops to their bottoms as follows, corresponding portions of each set being engaged by its respective trackway engaging members on the platform simultaneously: a first portion so constructed and arranged as to position the platform with its bucket confronting surface substantially vertical and horizontally opposite the bucket, a lower part of such first portion causing the platform to approach the bucket, a second portion so constructed and arranged that the platform revolves about the tilting axis of the bucket for a distance sufficient to bring the bucket confronting surface of the platform to an angle with respect to the horizontal substantially on the order of the angle of repose of the load on such platform surface, and a third portion which retracts the platform from the bucket to free the load from the bucket.

4. Apparatus for loading and unloading a pivotally supported load carrying device comprising a platform having a surface confronting the load carrying device of such size and shape that it will substantially cover the top of the load carrying device, means to guide the platform for movement from a position substantially horizontally opposite the load carrying device downwardly to a position beneath such carrying device, such guiding means comprising two spaced sets of trackways extending generally downwardly beneath the carrying device from one side thereof, trackway engaging members adjacent the ends of the platform, the members on one end of the platform engaging one set of trackways and those on the other end of the platform engaging the other set of trackways to cause each end of the platform to follow its respective set of trackways, and means to raise and lower the platform along the trackways, said last named means comprising at least one flexible member attached to the platform and running from above the platform in its fully raised position, and hoisting means engaging the flexible member to drive it to raise and lower the platform, each set of trackways having successive portions from their tops to their bottoms as follows, corresponding portions of each set being engaged by its respective trackway engaging members on the platform simultaneously: a first portion so constructed and arranged as to position the platform with its bucket confronting surface substantially vertical and horizontally opposite the bucket, a lower part of such first portion causing the platform to approach the bucket, a second portion so constructed and arranged that the platform revolves about the tilting axis of the bucket for a distance sufficient to bring the bucket confronting surface of the platform to an angle with respect to the horizontal substantially on the order of the angle of repose of the load on such platform surface, and a third portion which retracts the platform in a direction having a substantial vertical component away from the bucket to free the load from the bucket.

5. Apparatus for loading and unloading a pivotally supported load carrying device comprising a generally horizontal conveyor below such device, a supporting structure at one end of the conveyor, a platform carried by the supporting structure, such platform having a surface confronting the load carrying device such that it will substantially cover the load on such device, means on the supporting structure to support the platform for movement from a position substantially horizontally opposite the load carrying device downwardly to a position beneath such carrying device, and means to turn the platform in its downward travel from a substantially vertical position when opposite the carrying device so that it occupies a generally horizontal position when in its lower position beneath the carrying device, the platform when in such lower position lying substantially in line with the end of the conveyor and adjacent thereto so as to form a prolongation thereof.

6. Apparatus for loading and unloading a pivotally supported load carrying device when such device is located at a loading and unloading station comprising a generally horizontal conveyor at such station below such device, a supporting structure at one end of the conveyor, a platform carried by the supporting structure, such platform having a surface confronting the load carrying device at the loading and unloading station such that it will substantially cover the load on such device, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after approach of the platform toward such device and until it has assumed a position beneath it at an angle to the horizontal on the order of the angle of repose of the load on the platform that the platform substantially prevents escape of the load from the carrying device, the platform when in its lower position lying substantially in line with the end of the conveyor and adjacent thereto so as to form a prolongation thereof.

7. Apparatus for loading and unloading a pivotally supported load carrying device when such device is located at a loading and unloading station comprising a generally horizontal conveyor at such station below such device, a supporting structure at one end of the conveyor, a platform carried by the supporting structure, such platform having a surface confronting the load carrying device at the loading and unloading station such that it will substantially cover the load on such device, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after approach of the platform toward such device and until it has assumed a position beneath it at an angle to the horizontal on the order of the angle of repose of the load on the platform that the platform substantially prevents escape of the load from the carrying device, the platform when in its lower position lying substantially in line with the end of the conveyor and adjacent thereto so as to form a prolongation thereof, and a pusher member at the end of the platform in its lower generally horizontal position to thrust the load off the platform onto the conveyor.

8. Apparatus for loading and unloading a pivotally supported load carrying device when such device is located at a loading and unloading station comprising a generally horizontal conveyor at such station below such device, the conveyor being provided with load carrying conveyor rolls, a supporting structure at one end of the conveyor, a platform carried by the supporting structure, such platform having a surface confronting the load carrying device at the loading and unloading station such that it will substantially cover the load on such device, such platform surface being provided with load engaging conveyor rolls, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after initial approach of the platform toward such device and until it has assumed a position beneath it at an angle to the horizontal on the order of the angle of repose of the load on the platform that the platform substantially prevents escape of the load from the carrying device, the platform when in its lower position lying substantially in line with the end of the conveyor and adjacent thereto so as to form a prolongation thereof.

9. Apparatus for loading and unloading a pivotally supported load carrying device when such device is located at a loading and unloading station comprising a generally horizontal conveyor at such station below such device, the conveyor being provided with load carrying conveyor rolls, a supporting structure at one end of the conveyor, a platform carried by the supporting structure, such platform having a surface confronting the load carrying device at the loading and unloading station such that it will substantially cover the load on such device, such platform surface being provided with load engaging conveyor rolls, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after approach of the platform toward such device and until it has assumed a position beneath it at an angle to the horizontal on the order of the angle of repose of the load on the platform that the platform substantially prevents escape of the load from the carrying device, the platform when in its lower position lying substantially in line with the end of the conveyor and adjacent thereto so as to form a prolongation thereof, the end of the platform which is uppermost when the platform is positioned vertically having a stop thereon selectively projectable above the surface of the platform confronting the load carrying device and retractable therebelow, whereby the load on the platform in its lower generally horizontal position may be restrained from travel onto the conveyor by the projected stop until such stop is retracted.

10. Apparatus for loading and unloading a bucket-like load carrying device mounted in a depending bracket for tilting movement about a pivotal axis so that it may be inverted which comprises a platform having a surface confronting the load carrying device of such size and shape that it will substantially cover the top of the load carrying device, a pair of spaced guide members disposed adjacent said platform at a predetermined distance therefrom for receiving said depending bracket to maintain the load carrying device in fixed position relative to said platform, means to support the platform for movement from a position substantially horizontally opposite the load carrying device downwardly to a position beneath such carrying device, means to cause the platform automatically to assume a substantially vertical position when opposite the carrying device and substantially spaced therefrom, means to cause the platform to approach the load carrying device while the platform is still in substantially vertical position, and means automatically to turn the platform in its downward travel so that it occupies a lower generally horizontal position when beneath the carrying device, the platform being so spaced from the pivotal axis of the carrying device after initial approach of the platform toward such device and until it has assumed a position beneath it at an angle to the horizontal on the order of the angle of repose of the load on the platform that the platform substantially prevents escape of the load from the carrying device.

NATHANAEL B. GREENE.
ELMER J. LLOYD.

REFERENCES CITED

The following references are of record in the file of this patent:

UNITED STATES PATENTS

| Number | Name | Date |
|---|---|---|
| 1,373,604 | Dyer | Apr. 5, 1921 |